Patented Aug. 4, 1942

2,292,334

UNITED STATES PATENT OFFICE 2,292,334

ALDEHYDE-ACETOACETANILIDE CONDENSATION PRODUCT

Gaetano F. D'Alelio, Pittsfield, Mass., assignor to General Electric Company, a corporation of New York No Drawing. Application October 29, 1941, Serial No. 416,991

19 Claims. (Cl. 260—42)

This invention relates to the production of new synthetic materials and more particularly to new reaction products of particular utility in the plastics and coating arts. Specifically the invention is concerned with compositions of matter comprising a condensation product of ingredients comprising an aldehyde, including polymeric aldehydes and aldehyde-addition products, e. g., formaldehyde, paraformaldehyde, dimethylol urea, hexamethylol melamine, etc., and a halogenated or non-halogenated acetoacetanilide or mixture thereof, that is, at least one organic compound selected from the class consisting of acetoacetanilide and halogenated acetoacetanilides.

This application is a continuation-in-part of my copending application Serial No. 205,007, filed April 29, 1938, now Patent No. 2,276,828, issued March 17, 1942, and assigned to the same assignee as the present invention. Application Serial No. 205,007 is a continuation-in-part of my application Serial No. 169,465, filed October 16, 1937, now Patent No. 2,239,440, issued April 22, 1941.

The present invention is based on the discovery that organic compounds having a methylene (or halogeno-substituted methylene) group attached to two carbon atoms which are at least double-bonded, and one of which is attached to a nitrogen atom and the other to an organic group that need not be reactive, constitute a class of substances which on reaction with an aldehyde, e. g., formaldehyde, form resinous compositions which are of interest to the plastics, paint and textile industries.

In the parent application I disclosed and claimed compositions of matter comprising the resinous product of reaction of ingredients comprising an aliphatic aldehyde and a methylene-containing nitrogen compound selected from the class of compounds represented by the general formulas:

(a) 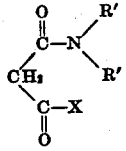

and (b) 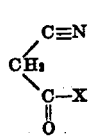

where X is a grouping of the class represented by R and OR, R is a member of the class consisting of alkyl and aryl groupings and R' is a member of the class which is the same as R and, in addition, hydrogen.

The present invention differs from the invention claimed in the parent case in that the nitrogen compound used in producing the compositions of the invention is acetoacetanilide, or nuclearly halogenated acetoacetanilide, or acetoacetanilide which is halogenated in the acetoacetyl grouping or in both the acetoacetyl grouping and in the benzene nucleus, or a mixture of such compounds. Another difference is that the aldehydic reactant may be any aldehyde, including polymeric aldehydes and aldehyde-addition products. Compositions produced by reaction of an aliphatic aldehyde, specifically formaldehyde, with acetoacetanilide were first disclosed in the parent copending application Serial No. 205,007.

In carrying my invention into effect the initial condensation reaction may be carried out at normal or at elevated temperatures, at atmospheric, sub-atmospheric or superatmospheric pressures and under neutral, alkaline or acid conditions.

Any substance yielding an alkaline or an acid aqueous solution may be used in obtaining alkaline or acid conditions for the initial condensation reaction. For example, I may use an alkaline substance such as sodium, potassium or calcium hydroxides, sodium or potassium carbonates, mono-, di- or tri-amines, etc. Good results are obtained by causing the condensation reaction between the primary components to take place in the presence of a primary condensation catalyst and a secondary condensation catalyst. The primary catalyst advantageously is a member of the class consisting of (1) nitrogen-containing basic tertiary compounds that are aldehyde-non-reactable, e. g., tertiary amines such as trialkyl (e. g., trimethyl, triethyl, etc.) amines, triaryl (e. g., triphenyl, tricresyl, etc.) amines, etc., and (2) nitrogen-containing basic compounds that are aldehyde reactable, for instance, ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, should be a fixed alkali, for instance, a carbonate, cyanide or hydroxide of an alkali metal (e. g., sodium, potassium, lithium, etc.).

Illustrative examples of acid condensation catalysts that may be employed are inorganic or organic acids such as hydrochloric, sulfuric, phosphoric, acetic, lactic, acrylic, malonic, etc., or acid salts such as sodium acid sulfate, monosodium phosphate, monosodium phthalate, etc. Mixtures of acids, of acid salts or of acids and of acid salts may be employed if desired.

The reaction between the aldehyde, e. g., formaldehyde, and the halogenated or non-halogenated acetoacetanilide may be carried out in the presence of solvents or diluents, fillers, other natural or synthetic resinous bodies, or while admixed with other materials that also can react with the aldehydic reactant or with the halogenated or non-halogenated acetoacetanilide. Examples of such modifying reactants are ketones, including halogenated ketones, urea, thiourea, selenourea, iminourea (guanidine), substituted ureas, thioureas, selenoureas and iminoureas, numerous examples of which are given in my various copending applications, for instance in my copending application Serial No. 363,037, filed October 26, 1940; monoamides of monocarboxylic and polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monoamide, diamide and triamide of tricarballylic acid, etc.; aminotriazines, e. g., melamine, ammeline, ammelide, melem, melon, melam, numerous other examples being given in my various copending applications, for instance in application Serial No. 377,524, filed February 5, 1941, and in applications referred to in said copending application; phenol and substituted phenols, e. g., the cresols, the xylenols, the tertiary alkyl phenols and other phenols such as mentioned in my Patent 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc. and the like.

These modifying reactants may be incorporated with the aldehyde and the halogenated or non-halogenated acetoacetanilide by mixing all the reactants and effecting condensation therebetween or by various permutations of reactants as described, for example, in my copending application Serial No. 363,037 with particular reference to reactions involving a urea, an aldehyde and a semi-amide of oxalic acid. For instance, I may form a partial condensation product of ingredients comprising at least one aldehyde, e. g., formaldehyde, and acetoacetanilide, and thereafter cause a curing reactant, for example a chlorinated acetamide, to intercondense with the said partial condensation product; or, instead of a chlorinated acetamide, I may use an acetoacetanilide which is halogenated, e. g., chlorinated, brominated, etc., in the acetoacetyl grouping or in both the acetoacetyl grouping and in the benzene nucleus. Also, I may form a partial condensation product of ingredients comprising (1) an aminotriazine (e. g., melamine) or a urea (e. g., urea itself) or both an aminotriazine and a urea, (2) acetoacetanilide or a halogenated acetoacetanilide (e. g., a nuclearly halogenated acetoacetanilide) or both acetoacetanilide and a halogenated acetoacetanilide, and (3) an aldehyde, including polymeric aldehydes and aldehyde-addition products (e. g., formaldehyde, dimethylol urea, trimethylol melamine, hexamethylol melamine, etc.), and thereafter effect reaction between this partial condensation product and, for example, a chlorinated acylated urea, a chlorinated acetamide, etc.

Some of the condensation products of this invention are thermoplastic materials even at an advanced stage of condensation while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, etc., may be used, for example, in the production of molding compositions.

Depending upon the particular reactants employed and the particular conditions of reaction, the intermediate or partial condensation products vary from clear, colorless or colored, syrupy, water-soluble liquids to viscous, milky dispersions and gel-like masses of decreased solubility in ordinary solvents such as alcohol, glycol, glycerine, water, etc. These liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance, as surface coating materials, in the production of paints, varnishes, lacquers, enamels, etc., for general adhesive applications, in producing laminated articles and for numerous other purposes. The liquid, heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how this invention may be carried into effect, the following examples are given by way of illustration. All parts are by weight.

*Example 1*

Ten (10) parts acetoacetanilide, 16.1 parts of aqueous formaldehyde containing approximately 37.1% HCHO and 0.1 part sodium hydroxide in 10 parts water are mixed and refluxed for 1 hour and dehydrated to a pale resin insoluble in water but soluble in ethyl alcohol. When alcoholic solutions are evaporated they leave clear, transparent films that are quite resistant to scratching. The softening point of the resin is advanced when heated to 160° C.

*Example 2*

Five (5) parts acetoacetanilide, 4 parts of aqueous formaldehyde containing approximately 37.1% HCHO and 0.05 part sodium hydroxide in 10 parts water are refluxed for 1 hour and then dehydrated, yielding a resin somewhat similar to the product of Example 1 but not so clear.

*Example 3*

| | Parts |
|---|---|
| Acetoacetanilide | 88.5 |
| Acetaldehyde | 65.0 |
| Water | 100.0 |
| Sodium hydroxide in 20 parts water | 1.0 | were heated together under reflux at the boiling temperature of the mass for ½ hour. The resulting product was dehydrated by heating at 50° C. for 8½ hours, followed by heating at 100° C. for 3½ hours, yielding a hard, brown, thermoplastic resin which melted at about 150° C. to a thick, waxy state.

Example 4

| | Parts |
|---|---|
| Acetoacetanilide | 88.5 |
| Acrolein | 85.0 |
| Water | 100.0 |

To a mixture of the above components was added one drop of a solution of 1 part sodium hydroxide in 20 parts water. A violent reaction occurred and a resinous mass precipitated out. The reaction mass was heated under reflux for 30 minutes, followed by heating at 50° C. for about 5 hours and at 100° C. for 4 hours. The resulting product was a hard, reddish yellow, thermoplastic resin which melted to a fluid mass at about 150° C.

Example 5

| | Parts |
|---|---|
| Acetoacetanilide | 177.1 |
| Aqueous formaldehyde (approx. 37.1% HCHO) | 161.0 |
| Aqueous ammonia (approx. 28% NH₃) | 6.0 |
| Sodium hydroxide in 10 parts water | 0.04 |

All of the above components were heated together at the boiling temperature of the mass under reflux for 10 minutes. At the end of this reaction time, a yellow resinous material had formed and precipitated out of solution. This resin was thermoplastic. It did not cure to a hard, infusible state when heated on a 140° C. hotplate.

Example 6

| | Parts |
|---|---|
| Acetoacetanilide | 35.4 |
| Urea | 108.0 |
| Aqueous formaldehyde (approx. 37.1% HCHO) | 322.0 |
| Aqueous ammonia (approx. 28% NH₃) | 12.0 |
| Sodium hydroxide in 20 parts water | 0.08 |

All of the above components were heated together under reflux at the boiling temperature of the mass for 30 minutes, yielding a yellow resinous syrup that became slightly cloudy when cooled to room temperature. This syrup was potentially heat-curable as evidenced by the fact that when small samples of it, containing various curing catalysts or curing reactants, for example glycine, sodium chloracetate, citric acid, citric acid diamide and N-diethyl chloroacetamide in an amount corresponding to from 1 to 2% by weight of the syrup, were heated on a 140° C. hotplate, the resin cured to a hard, infusible state.

The remainder of the syrup was mixed with 2 parts chloroacetamide and the mixture was heated under reflux at boiling temperature for 5 minutes to cause the chloroacetamide to inter-condense with the urea-acetoacetanilide-formaldehyde partial condensation product. The resulting hot resinous syrup was mixed with 120 parts alpha cellulose in flock form and 0.8 part of a mold lubricant, specifically zinc stearate, to form a molding (moldable) compound. The wet compound was dried at 63° C. for 3 hours. A sample of the dried and ground molding compound was molded for 3 minutes at 140° C. under a pressure of 2,000 pounds per square inch, yielding a well-cured piece.

Instead of using active or latent curing catalysts or curing reactants such as above mentioned in accelerating the curing of the potentially reactive resinous material, heat-convertible compositions may be produced by incorporating into the partial condensation product other curing catalysts, e. g., direct or active curing catalysts such as phthalic anhydride, malonic acid, oxalic acid, etc., or latent curing catalysts other than sodium chloroacetate or N-diethyl chloroacetamide, e. g., glycine ethyl ester hydrochloride. Or, instead of curing reactants such as glycine, citric acid diamide or chloroacetamide (monochloroacetamide), I may use, for example, dichloroacetamide, trichloroacetamide, chloroacetonitriles, alpha beta dibromopropionitrile, aminoacetamide hydrochloride, aminoacetonitrile hydrochloride, ethylene diamine monohydrochloride, ethanolamine hydrochlorides, nitrourea, chloroacetyl urea, chloroacetone, phenacyl chloride, etc. Other examples of active and latent curing catalysts and of curing reactants that may be employed to accelerate or to effect the curing of the thermosetting or potentially thermosetting resins of this and other examples are given in various copending applications of mine, for instance in copending application Serial No. 346,962, filed July 23, 1940, and application Serial No. 354,395, filed August 27, 1940, both of which applications are assigned to the same assignee as the present invention.

Example 7

| | Parts |
|---|---|
| Acetoacetanilide | 17.7 |
| Thiourea | 7.6 |
| Urea | 108.0 |
| Aqueous formaldehyde (approx. 37.1% HCHO) | 322.0 |
| Aqueous ammonia (approx. 28% NH₃) | 12.0 |
| Sodium hydroxide in 20 parts water | 0.08 |

All of the above components were heated together under reflux at the boiling temperature of the mass for 30 minutes. Small samples of the resulting syrup were treated with about 1 to 2% by weight thereof of citric acid, citric acid diamide, glycine and sodium chloroacetate. When the resulting mixture was heated on a 140° C. hotplate, each sample cured to an insoluble and infusible state.

The remainder of the syrup was mixed with 2 parts trichloroacetamide and the mixture was heated under reflux at boiling temperature for 10 minutes. The resulting hot resinous syrup was mixed with 130 parts alpha cellulose and 0.8 part zinc stearate to form a molding compound. The wet compond was dried at 63° C. until sufficient moisture had been removed to yield a compound that could be molded satisfactorily. Well-cured molded pieces were produced by molding sample of the dried and ground compound for 2 minutes at 140° C. under a pressure of 2,000 pounds per square inch.

Example 8

| | Parts |
|---|---|
| Acetoacetanilide | 35.4 |
| Melamine | 25.2 |
| Urea | 96.0 |
| Aqueous formaldehyde (approx. 37.1% HCHO) | 322.0 |
| Aqueous ammonia (approx. 28% NH₃) | 12.0 |
| Sodium hydroxide in 40 parts water | 0.16 | were heated together under reflux at boiling temperature for 30 minutes, yielding a syrup that was heat-convertible to an insoluble and infusible state when small samples of it were treated with from 1 to 2% by weight thereof of citric acid, glycine, citric acid diamine, sodium chloroacetate or N-diethyl chloroacetamide, followed by heating on a 140° C. hotplate.

The remainder of the syrup was mixed with 2 parts chloroacetamide and the mixture was heated under reflux at boiling temperature for 5 minutes. A molding compound was made from the resulting hot resinous syrup by mixing therewith 130 parts alpha cellulose and 0.8 part zinc stearate. The wet compound was dried for 3 hours at 63° C. A sample of the dried and ground molding compound was molded for 2 minutes at 140° C. under a pressure of 2,000 pounds per square inch, yielding a well-cured molded piece.

*Example 9*

| | Parts |
|---|---|
| Acetoacetanilide | 8.85 |
| Melamine | 133.0 |
| Aqueous formaldehyde (approx. 37.1% HCHO) | 283.0 |
| Aqueous ammonia (approx. 28% NH₃) | 6.0 |
| Sodium hydroxide in 20 parts water | 0.08 | were heated together under reflux at the boiling temperature of the mass for 10 minutes. The resulting syrup was potentially heat-curable, as evidenced by the fact that when curing agents such as mentioned in the preceding example were added to small samples of the syrup, insoluble and infusible resins were obtained when the individual sample was heated on a 140° C. hotplate. Phthalic anhydride and monochloroacetamide also are satisfactory curing agents for this syrup.

The remainder of the syrup was mixed with 1 part dichloroacetamide and the mixture was heated under reflux at the boiling temperature of the mass for 5 minutes. The resulting hot resinous syrup was mixed with 65 parts alpha cellulose in flock form and 0.4 part zinc stearate to form a molding compound. The wet compound was dried for 3 hours at 63° C. Well-cured molded pieces were obtained by molding samples of the dried and ground molding compound for 2 minutes at 140° C. under a pressure of 2,000 pounds per square inch.

*Example 10*

| | Parts |
|---|---|
| Acetoacetanilide | 17.7 |
| Dimethylol urea (commercial grade, containing about 11% by weight water) | 121.5 |
| Aqueous ammonia (approx. 28% NH₃) | 10.0 |
| Sodium hydroxide in 5 parts water | 0.01 |
| Water | 100.0 |

The above components were heated together under reflux at the boiling temperature of the mass for 15 minutes, yielding a yellow syrup with a small amount of an orange-colored resinous precipitate. The acetoacetanilide - dimethylol urea partial condensation product was heat-curable, as evidenced by the fact that when from 1 to 2% by weight thereof of glycine was added to a small sample of this group, it cured to an insoluble and infusible state upon heating on a 140° C. hotplate.

The remainder of the resin syrup was mixed with 1 part chloroacetamide and the mixture was heated under reflux at boiling temperature for 10 minutes. The resulting hot resinous syrup was mixed with 80 parts alpha cellulose and 0.4 part zinc stearate to form a molding compound. The wet compound was dried at 63° C. for 5¼ hours. A sample of the dried and ground molding compound was molded for 5 minutes at 130° C. under a pressure of 2,000 pounds per square inch, yielding a well-cured molded piece.

*Example 11*

| | Parts |
|---|---|
| Acetoacetanilide | 8.85 |
| Urea | 54.0 |
| Guanazole | 5.0 |
| Aqueous formaldehyde (approx. 37.1% HCHO) | 161.0 |
| Aqueous ammonia (approx. 28% NH₃) | 6.0 |
| Sodium hydroxide in 20 parts water | 0.08 | were heated together under reflux at the boiling temperature of the mass for 15 minutes, yielding a resinous syrup which was potentially heat-curable as evidenced by the fact that the addition of approximately 1% by weight of curing agents such as mentioned under Example 8 to small samples of the syrup caused the individual sample to convert to an insoluble and infusible state when it was heated on a 140° C. hotplate.

The remainder of the syrup was mixed with 1 part chloroacetamide and the mixture was heated under reflux at boiling temperature for 5 minutes. The resulting hot resinous syrup was mixed with 60 parts alpha cellulose and 0.4 part zinc stearate to form a molding compound. The wet compound was dried for 5 hours at 63° C. Well-cured molded pieces were obtained by molding samples of the dried and ground molding compound for 5 minutes at 140° C. under a pressure of 2,000 pounds per square inch.

Instead of acetoacetanilide mentioned in the above illustrative examples, I may substitute (in whole or in part) an acetoacetanilide which is halogenated in the benzene nucleus, in the acetoacetyl grouping or in both the benzene nucleus and in the acetoacetyl grouping. Illustrative samples of such halogenated acetoacetanilides are listed below:

$CH_3COCHClCONHC_6H_5$
$CH_3COCHClCONHC_6H_4Cl$
$CH_3COCHBrCONHC_6H_4CH_3$
$CH_3COCH_2CONHC_6H_4Cl$
$CH_3COCH_2CONHC_6H_3Br_2$
$CH_3COCH_2CONHC_6H_3Cl_2$
$CH_3COCH_2CONHC_6H_2Cl_3$
$CH_3COCH_2CONHC_6HCl_4$
$CH_3COCH_2CONHC_6Cl_5$
$ClCH_2COCH_2CONHC_6H_5$
$ClCH_2COCHClCONHC_6H_5$
$ClCH_2COCH_2CONHC_6H_4Cl$
$ClCH_2COCHClCONHC_6H_4Cl$
$BrCH_2COCH_2CONHC_6H_5$
$ICH_2COCH_2CONHC_6H_5$
$ICH_2COCH_2CONHC_6H_4NO_2$
$BrCH_2COCHBrCONHC_6H_5$
$BrCH_2COCHBrCONHC_6H_4F$
$BrCH_2COCH_2CONHC_6H_4Cl$
$BrCH_2COCHBrCONHC_6H_4Br$
$ClCH_2COCH_2CONHC_6H_4OC_2H_5$
$ClCH_2COCH_2CONHC_6H_4COOCH_3$
$ClCH_2COCH_2CONHC_6H_4Br$

The above halogenated compounds are produced by reaction of the corresponding aryl amine and the corresponding acetoacetyl chloride.

In producing these new condensation products the choice of the aldehyde is dependent largely upon economic considerations and upon the particular properties desired in the finished product. I prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, benzaldehyde, furfural, etc., mixtures thereof, or mixtures of formaldehyde (or compounds engendering formaldehyde) with such aldehydes. Illustrative examples of aldehyde-addition products that may be used instead of the aldehydes themselves are the mono- and poly-(N-carbinol) derivatives, more particularly the mono- and poly-methylol derivatives of urea, thiourea, selenourea and iminourea, substituted ureas, thioureas, selenoureas and iminoureas (numerous examples of which are given in my copending application Serial No. 377,524, filed February 5, 1941, mono- and poly-(N-carbinol) derivatives of amides of polycarboxylic acids, e. g., maleic, itaconic, fumaric, adipic, malonic, succinic, citric, phthalic, etc., mono- and poly-(N-carbinol) derivatives of amidogentriazines, numerous examples of which are given in my copending application Serial No. 377,524. Good results are obtained with active methylene-containing bodies such as mono- and di-methylol ureas and the methylol aminotriazines such, for instance, as the methylol melamines, e. g., mono-, di-, tri-, tetra-, penta- and hexa-methylol melamines. Mixtures of aldehydes and aldehyde-addition products may be employed, for example mixtures of formaldehyde and methylol compounds such, for instance, as dimethylol urea, polymethylol melamines, e. g., hexamethylol melamine, etc.

Various proportions of aldehydes may be used in the condensation reaction from an amount insufficient to combine in molecular proportions with the halogenated or non-halogenated acetoacetanilide (or with the mixture of the said acetoacetanilide and other modifying addition agent which is reactable with an aldehyde) to a molecular excess of the aldehyde. For example, 1 mol of halogenated or non-halogenated acetoacetanilide may be condensed with from 1 to 7 mols of an aldehyde, specifically formaldehyde, to form masses with different properties. In general, it is desirable that the halogenated or non-halogenated acetoacetanilide and the aldehyde be present in the reaction mass in the ratio of 1 mol of the former to at least 1 mol of the latter. When the aldehyde is available for reaction in the form of an aldehyde-addition product such, for instance, as dimethylol urea, hexamethylol melamine, etc., then higher amounts of such aldehyde-addition products ordinarily are used, for example up to 12 or 15 mols of the aldehyde-addition product for each mol of halogenated or non-halogenated acetoacetanilide, or mixture thereof, or mixture of such acetoacetanilide and other addition agent, e. g., urea, melamine, etc., which is reactable with the aldehyde-addition product.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, isobutyl, hexyl, etc., alcohols; polyhydric alcohols such as ethylene glycol, diethylene glycol, glycerine, pentaerythritol, polyvinyl alcohol, etc.; amides such as formamide, acetamide, stearamide, acryloamide, toluene sulfonamides, benzene disulfonamides and trisulfonamides, adipic diamide, etc.; amines such as ethylene diamine, phenylene diamine, etc.; phenol and substituted phenols, including aminophenols, etc.; nitriles, including halogenated nitriles, e. g., acrylonitrile, methacrylonitrile, succinonitrile, chloroacetonitriles, etc.; acylated ureas, including halogenated acylated ureas such as described, for example, in D'Alelio copending applications Serial No. 289,273, filed August 9, 1939, now Patent No. 2,281,559, issued May 5, 1942, and Serial No. 400,649, filed July 1, 1941; and others.

The modifying bodies also may take the form of high molecular weight bodies with or without resinous characteristics, for example, hydrolyzed wood products, formalized cellulose derivatives, lignin, protein-aldehyde condensation products, resins obtained by reaction of an aldehyde with the aminotriazines, the aminodiazines, the aminotriazoles, or the aminodiazoles, alone or admixed with each other or with, for example, urea, malonic diamide, maleic diamide, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums, resins such as shellac, rosin. etc.; polyvinyl compounds such as polyvinyl esters, e. g., polyvinyl acetate, polyvinyl butyrate, etc.; polyvinyl ethers, including polyvinyl acetals, specifically polyvinyl formal, etc.

Dyes, pigments, plasticizers, mold lubricants, opacifiers, curing accelerators and various fillers (e. g., wood flour, alpha cellulose, glass fibers, asbestos, including defibrated asbestos, mineral wool, mica, cloth cuttings, etc.) may be compounded with the resin in accordance with conventional practice to provide various thermoplastic and thermosetting molding compositions.

The modified or unmodified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be used as impregnants for electrical coils and for other electrically insulating applications.

What I claim as new and desire to secure by Letters Patent of the United States is:

1. A composition of matter comprising the reaction product of ingredients comprising at least one aldehyde and at least one organic compound selected from the class consisting of acetoacetanilide and halogenated acetocetanilides.

2. A composition as in claim 1 wherein the aldehyde reactant is formaldehyde.

3. A composition as in claim 1 wherein the reaction product is an alkaline-catalyzed reaction product of the stated components.

4. A resinous composition obtained by reaction of ingredients comprising formaldehyde and acetoacetanilide.

5. A composition comprising the resinous product of reaction of ingredients comprising formaldehyde and a chlorinated acetoacetanilide.

6. A composition of matter comprising the condensation product of ingredients comprising (1) a urea, (2) an aldehyde, and (3) at least one organic compound selected from the class consisting of acetoacetanilide and halogenated acetoacetanilides.

7. A composition of matter comprising the condensation product of ingredients comprising (1) an aminotriazine, (2) an aldehyde, and (3) at least one organic compound selected from the class consisting of acetoacetanilide and halogenated acetoacetanilides.

8. A composition comprising the resinous product of reaction of ingredients comprising urea, formaldehyde and at least one organic compound selected from the class consisting of acetoacetanilide and halogenated acetoacetanilides.

9. A composition comprising the resinous product of reaction of ingredients comprising urea, formaldehyde and a chlorinated acetoacetanilide.

10. A heat-curable composition comprising the heat-convertible partial condensation product of ingredients comprising urea, formaldehyde and an acetoacetanilide which is chlorinated at least in the acetoacetyl grouping thereof.

11. A product comprising the heat-cured composition of claim 10.

12. A composition comprising the resinous product of reaction of ingredients comprising dimethylol urea and at least one organic compound selected from the class consisting of acetoacetanilide and halogenated acetoacetanilides.

13. A composition comprising a condensation product of ingredients comprising a polymethylol aminotriazine and at least one organic compound selected from the class consisting of acetoacetanilide and halogenated acetoacetanilides.

14. A composition comprising a condensation product of ingredients comprising urea, melamine, formaldehyde and at least one organic compound selected from the class consisting of acetoacetanilide and halogenated acetoacetanilides.

15. A composition comprising the product of reaction of (1) a partial condensation product of ingredients comprising an aldehyde and acetoacetanilide, and (2) a chlorinated acetamide.

16. A heat-curable composition comprising the heat-convertible reaction product of (1) a partial condensation product of ingredients comprising urea, formaldehyde and acetoacetanilide, and (2) a chlorinated acetamide.

17. A product comprising the heat-cured composition of claim 16.

18. A composition of matter comprising the product of reaction of (1) a partial condensation product of ingredients comprising urea and formaldehyde, and (2) an acetoacetanilide which is chlorinated at least in the acetoacetyl grouping thereof.

19. The method of producing new synthetic compositions which comprises effecting reaction between ingredients comprising an aldehyde and at least one organic compound selected from the class consisting of acetoacetanilide and halogenated acetoacetanilides.

GAETANO F. D'ALELIO.

CERTIFICATE OF CORRECTION.

Patent No. 2,292,334.  August 4, 1942.

GAETANO F. D'ALELIO.

It is hereby certified that error appears in the printed specification of the above numbered patent requiring correction as follows: Page 4, first column, line 61, for "group" read --syrup--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.